J. W. EVANS.
Shovel and Tongs.
No. 28,264.
Patented May 15, 1860.
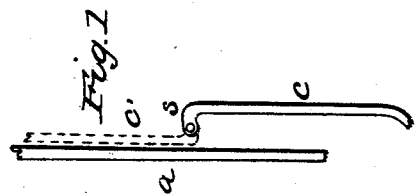
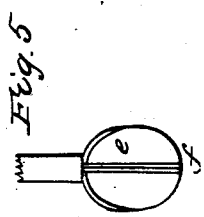
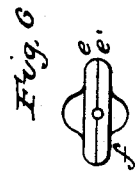
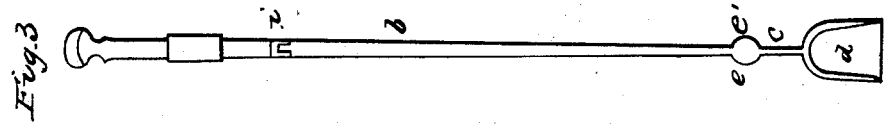
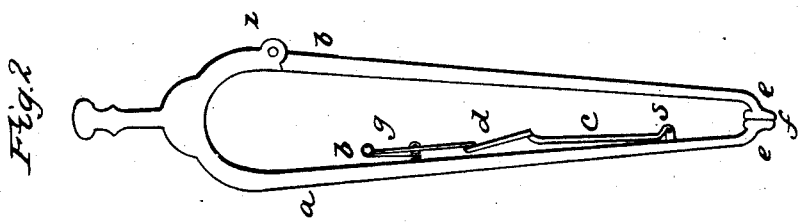
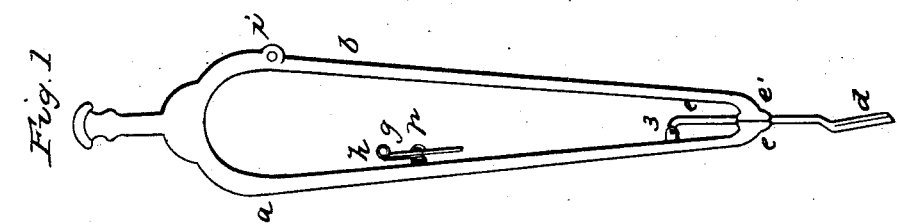
Witnesses
A. Tho Smith
R. B. Donaldson
Inventor
J. W. Evans
Forsyth Ga.
By T. H. Stearns Attorney

UNITED STATES PATENT OFFICE.

J. W. EVANS, OF FORSYTH, GEORGIA.

COMBINATION OF SHOVEL AND TONGS.

Specification of Letters Patent No. 28,264, dated May 15, 1860.

*To all whom it may concern:*

Be it known that I, J. W. EVANS, of Forsyth, county of Monroe, State of Georgia, have invented a new and Improved Method of Combining the Household Implements of Shovel and Tongs Into One Instrument; and I do hereby declare that the following is a full and exact description of the same, reference being had to the accompanying drawings and to the letters of reference marked thereon, which constitute a part of this specification, in which—

Figure 1 is a perspective view of the implement with the shovel extended ready for use as a shovel. Fig. 3 is another view with the shovel also extended. Fig. 2 represents the implement with the shovel folded up in its position when the implement is in use as a pair of tongs simply. Fig. 4 shows the particular form of the shank or handle of the shovel and the manner in which it is thrown back out of the way when folded up. Fig. 5 exhibits the groove in the clasping face of the tongs, to receive the shank of the shovel and retain it in place while in use as a shovel. Fig. 6 is an end view showing the cylindrical hole formed by the two legs of the tongs when placed in opposition.

The letter —a— refers to the immovable leg of the tongs, b the movable leg which is thrown outward by means of the pivot —i—.

c is the handle or shank of the shovel; d the shovel; e e' the extremity of the tongs which holds the shovel in place by means of the groove f—. At g there is a latch which turns on a pivot —p— and is kept parallel with the leg a by means of the spring —h—.

The manipulation of the implement is as follows: When in use as fire tongs, the implement is folded up as represented in Fig. 2. And when it is desired to bring the shovel into requisition the leg b is extended, the latch g turned to one side and the shovel is free to turn on its pivot s, and is adjusted into the groove —e—. The leg b is now brought down in place and the groove e' fitting the shank like its fellow, completely incloses it, and the hand of the operator easily and firmly keeps it in place, so that the whole now forms a complete shovel answering 'all the indications required in such an instrument. Reverse all the above motions and a pair of tongs will result in every way convenient for use.

What I claim as my invention and desire to secure by Letters-Patent—

Is the combination and arrangement of the shank of the shovel (c) with the axis of the leg a; the latch g, and spring h, and the groove f, substantially as herein set forth.

J. W. EVANS.

Witnesses:
J. A. MAGRUDER,
JESSE AYCOCK.